United States Patent
Liu

(10) Patent No.: US 10,276,859 B2
(45) Date of Patent: *Apr. 30, 2019

(54) CONDUCTIVE POLYMER AND SI NANOPARTICLES COMPOSITE SECONDARY PARTICLES AND STRUCTURED CURRENT COLLECTORS FOR HIGH LOADING LITHIUM ION NEGATIVE ELECTRODE APPLICATION

(71) Applicant: Gao Liu, Piedmont, CA (US)

(72) Inventor: Gao Liu, Piedmont, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,364

(22) Filed: Jul. 7, 2017

(65) Prior Publication Data

US 2018/0034041 A1    Feb. 1, 2018

Related U.S. Application Data

(62) Division of application No. 14/376,346, filed as application No. PCT/US2013/024427 on Feb. 1, 2013, now Pat. No. 9,705,127.

(Continued)

(51) Int. Cl.

| H01M 4/13 | (2010.01) |
| H01M 4/60 | (2006.01) |
| H01M 4/58 | (2010.01) |
| H01M 4/00 | (2006.01) |
| H01M 4/134 | (2010.01) |
| H01M 4/62 | (2006.01) |

(Continued)

(52) U.S. Cl.
CPC .......... *H01M 4/134* (2013.01); *H01B 1/12* (2013.01); *H01M 4/0416* (2013.01);

(Continued)

(58) Field of Classification Search
None
See application file for complete search history.

(56) References Cited

U.S. PATENT DOCUMENTS

| 8,383,272 B2 | 2/2013 | Iwama et al. |
| 8,852,461 B2 | 10/2014 | Liu et al. |

(Continued)

FOREIGN PATENT DOCUMENTS

WO    2010/135248 A1    11/2010

OTHER PUBLICATIONS

Xun et al, "Conductive Polymer and Silicon Composite Secondary Particles for a High Area-Loading Negative Electrode." Journal of the Electrochemical Society, vol. 160, No. 9, pp. A1380-A1383, Jun. 6, 2013.

(Continued)

*Primary Examiner* — Cynthia H Kelly
*Assistant Examiner* — Julian Anthony

(57) ABSTRACT

Embodiments of the present invention disclose a composition of matter comprising a silicon (Si) nanoparticle coated with a conductive polymer. Another embodiment discloses a method for preparing a composition of matter comprising a plurality of silicon (Si) nanoparticles coated with a conductive polymer comprising providing Si nanoparticles, providing a conductive polymer, preparing a Si nanoparticle, conductive polymer, and solvent slurry, spraying the slurry into a liquid medium that is a non-solvent of the conductive polymer, and precipitating the silicon (Si) nanoparticles coated with the conductive polymer. Another embodiment discloses an anode comprising a current collector, and a composition of matter comprising a silicon (Si) nanoparticle coated with a conductive polymer.

14 Claims, 17 Drawing Sheets

Related U.S. Application Data

(60) Provisional application No. 61/593,733, filed on Feb. 1, 2012.

(51) Int. Cl.
  *H01M 4/66* (2006.01)
  *H01M 4/1395* (2010.01)
  *H01M 4/36* (2006.01)
  *H01M 4/38* (2006.01)
  *H01M 10/0525* (2010.01)
  *H01B 1/12* (2006.01)
  *H01M 4/04* (2006.01)

(52) U.S. Cl.
  CPC ......... *H01M 4/1395* (2013.01); *H01M 4/366* (2013.01); *H01M 4/386* (2013.01); *H01M 4/602* (2013.01); *H01M 4/623* (2013.01); *H01M 4/661* (2013.01); *H01M 10/0525* (2013.01); *H01M 2220/20* (2013.01); *Y02T 10/7011* (2013.01)

(56) References Cited

U.S. PATENT DOCUMENTS

| | | |
|---|---|---|
| 9,437,870 B2 | 9/2016 | Zhang et al. |
| 2002/0164479 A1 | 11/2002 | Matsubara et al. |
| 2004/0126582 A1 | 7/2004 | Ng et al. |
| 2005/0136330 A1* | 6/2005 | Mao et al. ............ C25D 17/10 429/231.95 |
| 2005/0224765 A1 | 10/2005 | Hsu et al. |
| 2010/0136431 A1 | 6/2010 | Lee et al. |
| 2011/0073561 A1 | 3/2011 | Yamazaki et al. |
| 2011/0111294 A1 | 5/2011 | Lopez et al. |
| 2011/0123866 A1 | 5/2011 | Pan et al. |
| 2012/0021331 A1 | 1/2012 | Zhu et al. |

OTHER PUBLICATIONS

International Search Report and Written Opinion for International Application No. PCT/US13/24427 dated Apr. 11, 2013.

\* cited by examiner

CONDUCTIVE POLYMER AND SI NANOPARTICLES COMPOSITE SECONDARY PARTICLES AND STRUCTURED CURRENT COLLECTORS FOR HIGH LOADING LITHIUM ION NEGATIVE ELECTRODE APPLICATION

RELATED APPLICATIONS

This divisional application claims priority to U.S. application Ser. No. 14/376,346 filed Aug. 1, 2014, which in turn claims priority to PCT Application PCT/US2013/024427, filed Feb. 1, 2013, which in turn claims priority to U.S. Provisional Application Ser. No. 61/593,733 filed Feb. 1, 2012, which application is incorporated herein by reference as if fully set forth in their entirety.

STATEMENT OF GOVERNMENT SUPPORT

This invention was made with government support under Contract No. DE-AC02-05CH11231 awarded by the U.S. Department of Energy. The government has certain rights in this invention.

BACKGROUND OF THE INVENTION

The present invention relates to the field of lithium-ion batteries and, more particularly, to state-of-the art lithium-ion negative electrodes for lithium-ion batteries.

Due to the exponential growth in global energy consumption, rapid depletion of fossil fuels, concomitant growth in greenhouse gas emissions, and the upward spike in the prices of crude-oil and gasoline, significant concerns and efforts have been focused on the development of clean and renewable energy sources and advanced energy storage technologies.

Lithium-ion batteries are a type of rechargeable battery in which lithium ions move between the negative and positive electrode. The lithium ion moves through an electrolyte from the negative to the positive during discharge, and in reverse, from the positive to the negative, during recharge. Most commonly the negative electrode is made of graphite, which material is particularly preferred due to its stability during charge and discharge cycles as it forms solid electrolyte interface (SEI) layers with very small volume change.

Lithium ion batteries are finding ever increasing acceptance as power sources for portable electronics such as mobile phones and laptop computers that require high energy density and long lifetime. Such batteries are also finding application as power sources for automobiles, where recharge cycle capability and energy density are key requirements. In this regard, research is being conducted in the area of improved electrolytes, and improved electrodes. High-capacity electrodes for lithium-ion batteries have yet to be developed in order to meet the 40-mile plug-in hybrid electric vehicle (HEV) energy density needs that are currently targeted.

Further development of high-performance rechargeable lithium-ion batteries (LIBs) is indispensable for the ever growing needs for electric vehicles (EV), hybrid electric vehicles (HEV) and plug-in hybrid electric vehicles (PHEV). Remarkable research efforts have been devoted to improving the already incomparable performance of rechargeable LIBs which are ubiquitous in various fields since its successful commercialization about 20 years before.

The most popular graphite-based anodes, with a theoretical specific capacity of 372 mAh/g, are commonly used in commercially available rechargeable LIBs along with several types of Li oxide based cathodes (less than 170 mAh/g specific capacity). However, current graphite and transition metal oxide based electrodes only provide moderate energy-storage capability and therefore it is difficult for them to meet the increasing demands for advanced energy storage. Hence, it is essential to design and synthesize new anode materials that can offer the promise of high-performance LIBs with elevated efficiency, superior storage capacity and gravimetric energy density, longer cycle life, easier state-of-charge control, lower cost, and safer operation.

Silicon-based electrodes for rechargeable LIBs have attracted considerable attention because they are able to vastly improve the specific capacity of batteries. As a naturally abundant element, silicon has the highest theoretical specific capacity among all exiting materials, which can reach 4200 mAh g$^{-1}$ in the form of $Li_{4.4}Si$. Furthermore, Si is also inexpensive, easy to handle, and has low discharge potential when used as an anode for rechargeable LIBs. These unique attributes endow Si as one of the most promising candidates to replace graphite as the anode for high performance rechargeable LIB s.

Therefore, one approach is to replace graphite as the negative electrode with silicon. Notably graphite electrodes are rated at 372 mAh/g (milliamp hours per gram) at $LiC_6$, while silicon electrodes are rated more than tenfold better at 4,200 mAh/g at $Li_{4.4}Si$. However, numerous issues prevent this material from being used as a negative electrode material in lithium-ion batteries. Full capacity cycling of Si results in significant capacity fade due to a large volume change during Li insertion (lithiation) and removal (delithiation). This volumetric change during reasonable cycling rates induces significant amounts of stress in micron size Si particles, causing the particles to fracture. Thus an electrode made with micron-size Si particles has to be cycled in a limited voltage range to minimize volume change.

Decreasing the Si particle size to nanometer scale can be an effective means of accommodating the volume change. However, the repeated volume change during cycling can also lead to repositioning of the particles in the electrode matrix and result in particle dislocation from the conductive matrix. This dislocation of particles causes the rapid fade of the electrode capacity during cycling, even though the Si particles are not fractured. Novel nano-fabrication strategies have been used to address some of the issues seen in the Si electrode, with some degree of success.

Unfortunately, the potential of Si particles in broad commercial applications continues to be hindered by severe capacity fading and loss of electrical contact caused by huge volume change, structural crumbling, and even cracking during repeated charge and discharge cycling, especially at high current rates.

Downsizing from conventional bulk silicon to various nanoscale morphologies and structures or dispersing these nanostructured Si into carbon matrices are among the most appealing approaches being pursued to overcome these issues and to improve the overall electrochemical performance of Si-based anodes in rechargeable LIB s.

Thus, the size reduction can help to accommodate the volume change, release the huge stresses in the Si particles during continuous insertion/extraction processes, facilitate more efficient electronic/ionic diffusion, provide more active sites, and enhance structural flexibility as well, while the carbon component in the Si/carbon nanocomposite electrodes can create a conducting matrix to maintain the electrical contact of the electrode with the current collector, resulting in better endurance during charge/discharge cycling. In addition, the incorporation of Li-active Si into carbon-based electrodes can reduce the initial irreversible capacity, and improve both the Coulombic efficiency and cycling performance of anodes even at high current densities.

Graphene, a new class of two-dimensional, "aromatic," monolayer of carbon atoms densely packed in a honeycomb crystal lattice, has attracted unmatched attention and has also triggered tremendous experimental activities for applications in next generation electronic and energy storage devices, owing to its exceptional properties including extraordinarily high electronic mobility, outstanding optical transparency, unique electronic structures, intriguing thermal conductivity, and amazing mechanical strength as well as ultrahigh surface area.

Hence, graphene could be superior to other carbon materials as a conductive matrix to enhance electron transport and electrical contact with Si active materials in rechargeable LIB s and to effectively prevent the volume expansion/shrinkage and aggregation of Si phases during the Li charge/discharge processes. Furthermore, its large surface area can also facilitate the absorption of Li atoms on both sides of the graphene sheet or into its ubiquitous cavities. As a result, the merits of both carbon and Si phases can be extended to the largest extent based on their synergetic effects.

Recently, Chou et al. (S.-L. Chou, J.-Z. Wang, M. Choucair, H.-K. Liu, J. A. Stride, S.-X. Dou, *Electrochemistry Communications* 2010, 12, 303) blended commercially available nanosized Si particles and graphene to prepare eco-friendly and low cost LIB anodes, which exhibited enhanced cycling stability. In the meantime, several other groups also successfully prepared Si nanoparticles/graphene paper composite as anodes for rechargeable LIBs with high Li storage capability and cycling stability. (See J. K. Lee, K. B. Smith, C. M. Hayner, H. H. Kung, *Chemical Communications* 2010, 46, 2025: G. Wang, B. Wang, X. Wang, J. Park, S. Dou, H. Ahn, K. Kim, *Journal of Materials Chemistry* 2009, 19, 8378).

The studies also indicated that graphene can be used to anchor electrochemically active transition metal oxides or metal nanoparticles as anode materials for rechargeable LIB s, and these batteries exhibit enhanced cycle life and improved reversible capacity. See, for example, US Published Patent Application 2011/0033746, filed Aug. 10, 2009. The use of Si nanoparticles, however, may not provide a simple way to optimize the ion transport in the anode, especially when the loading of Si is high. Furthermore, the use of inactive binders to hold the Si and Carbon components together is required, which serves to reduce the overall energy capacity.

However, all of the above processes incur significantly higher manufacturing costs, as some of the approaches are not compatible with current Li ion manufacture technology. Thus, there remains the need for a simple, efficient and cost effective means for improving the stability and cycle-ability of silicon electrodes for use in lithium ion batteries.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Embodiments of the present invention address the low energy density and limited lifetime of the lithium-ion battery for EV/PHEV application, by applying new anode materials and engineering development. The two main issues that prevent Si from being used as negative electrodes in the lithium-ion chemistry are 1) limited cycling capacity (Limited energy density barrier); although Si promises high energy density, the achievable energy density is low due to the limited material loading (area specific capacity), and 2) high degree of side reactions (Limited lifetime); the reaction between electrolyte and Si surface causes significant high first cycle loss and subsequent fast fade of the lithium-ion cells. Embodiments of the present invention achieve higher energy density as well as prolonged cycling and storage lifetime.

Approach

Figure 1:
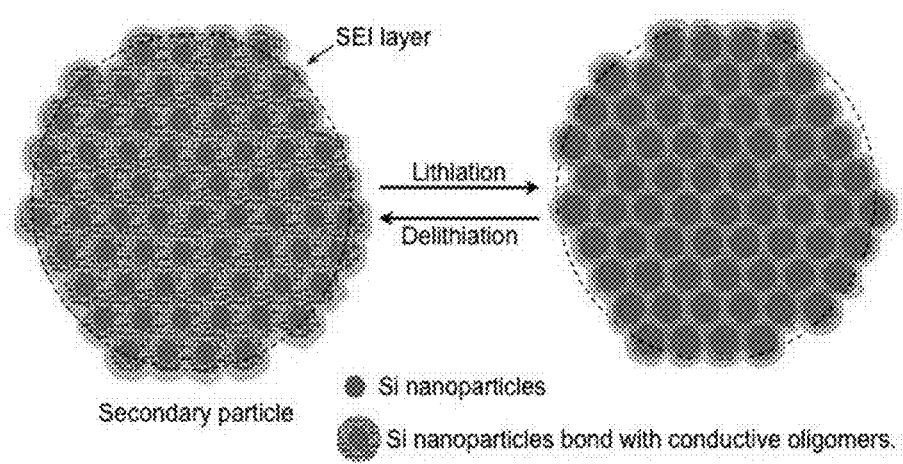
FIG. 1 illustrates a conceptual approach of Si nanoparticles to form hierarchy structures.

Si nanoparticles are mixed with a conductive polymer (such as a conductive polymer as described in U.S. patent application Ser. No. 13/294,885 entitled: Electrically Conductive Polymer Binder for Lithium-Ion Battery Electrode, incorporated by reference herein as if fully set forth in its entirety) to form micron size secondary particles as shown in FIG. 1. The conductive matrix is elastic to accommodate volume change within the structure of the secondary particles. The conductive matrix is impermeable to electrolyte solvent penetration, but allows Li ion reversible doping. This will limit direct electrolyte exposure to Si surface, and therefore minimize side reactions.

Si particles (0.1 nm-10 micron). Nano size Si particles can withstand repeated volume change during the Li ion insertion and removal process. These particles can be made by chemical vapor deposition (CVD), colloidal or processed from bulk Si ingot, or other processes. The Si can be n-dopted, p-doped or un-doped particles or a mixture of the above.

Conductive polymers. The conductive polymer can be the polymers as described in U.S. patent application Ser. No. 13/294,885, but may not be limited to such polymers. For example, PFFO (poly(9,9-dioctylfluorene-co-fluorenone)), PFFOMB (poly(9,9-dioctylfluorene-co-fluorenone-co-methylbenzoic acid)), PFFOBA (poly(9,9-dioctylfluorene-co-fluorenone-co-benzoic acid))

Formation of Secondary Polymer/Si Composite Structures

One aspect of an embodiment of the invention is to form "conductive polymer/primary Si nanoparticles" composite secondary particles. These secondary particles can be nano to micron size at different dimensions. The weight ratio of the conductive polymer to Si nanoparticle ranges from 0.01 to 100.

Weight ratio of the secondary particles:

Polymer:Si=0.01, Si component dominates.

Polymer:Si=100, Polymer component dominates.

The optimum size and shape depends on the Si nanoparticle size, the nature of the polymer and the performance of the Si nanoparticle/polymer electrode. The porosity of the secondary composite particles ranges from 0% to 70% void space or free volume. There are a variety of methods to generate these secondary composite particles. The Nanocomposite particles can be spherical particles, two-dimensional plates, or fibers. The discussion below describes the structural features and possible methods to achieve these features.

Sprayed Spherical Secondary Composite Particles

Figure 2:
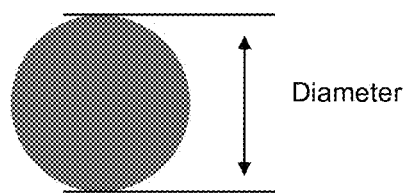
FIG. 2 illustrates a secondary spherical structure for Si/polymer composite. The diameter of the spheres is controlled for lithium-ion diffusion during lithiation and delithiation. The blue color spheres includes Si and conductive polymer.

FIG. 2 illustrates a secondary spherical structure for Si/polymer composite. The diameter of the spheres is controlled for lithium-ion diffusion during lithiation and delithiation. The depicted sphere includes Si and conductive polymer.

Slurry preparation: combine Si nanoparticles (0.09 g), a conductive polymer such as PFFOMB (poly(9,9-dioctyl-fluorene-co-fluorenone-co-methylbenzoic acid)) (0.18 g) in chlorobenzene (5 g) and sonicate for 2 minutes. A Branson 450 sonicator equipped with a solid horn may be used. The sonication power may be set at 70%. A continuous sequence of 2 s pulses followed by 58 s rests may be used. The 100 nm diameter (or smaller) Si nanoparticles sample may be purchased from Sigma-Aldrich.

Spray: The slurry is sprayed to a liquid medium (Hexane or methanol), which is a non-solvent of the polymer. The chlorobenzene solvent will diffuse into the liquid medium (Hexane or methanol). Therefore the nanoparticles solidify into polymer composite particles in the liquid and precipitates out.

Slurry was pumped to a wide spray ultrasonic atomizer nozzle and generator (Model 130K50ST, 130 kHz by Sonaer Inc, operating with 100% of power.) with syringe pump (Model 100 by KD Scientific). The sprayed fine particles were precipitated from 500 mL of methanol with magnetic stirring with a yield of 44%. The concentration of this slurry also effects the final composite particle size and porosity.

In sum, the slurry is sprayed to form micron size Si/conductive polymer composite particles. The size of the secondary particle is controlled by the slurry concentration and spray speed. The micron size composite secondary particle is advantageous for the stability of the Si electrode. This secondary particle limits the amount of surface area that can be exposed to an electrolyte, and therefore increases the surface stability of the electrolyte. The hydrophobic and carbon based conductive polymer minimizes the electrolyte penetration into the secondary particles and facilitates the SIE formation on the secondary particles. The volume expansion is accommodated within the secondary composite particles so there is minimum volume change of the secondary particles.

The polymer composite-Si secondary particle will be collected and used as negative electrode active materials to make electrodes with traditional approaches. The dimension of secondary composite particles range from 1 nm-1000 micron in diameter.

Spanned Fibers

Figure 3:
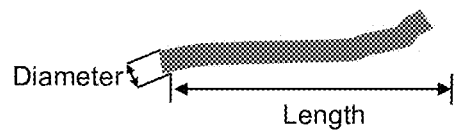
FIG. 3 illustrates a fiber structure for the Si/polymer composite. The diameter of the fiber is controlled for Lithium-ion diffusion during lithiation and delithiation. The blue color fiber includes Si and conductive polymer.

FIG. 3 illustrates a fiber structure for the Si/polymer composite. The diameter of the fiber is controlled for lithium-ion diffusion during lithiation and delithiation. The fiber includes Si and conductive polymer.

Since Li-ion transport is a main issue in the composite particles, spherical particles have a 3-d dimension within the same lithium ion diffusion distance. Another approach is to allow one dimension to expand and leave the other two dimensions within controlled, limited diffusion distance. A fiber geometry is described for this application. The cylindrical structure of the fiber allows two-dimension in the limited distance as the diameter of the fiber. The lithium-ion will diffuse through the fiber wall into the core at a limited distance, while the $3^{rd}$-dimension, along the fiber direction may provide good mechanical properties of the particle and electrode. The fiber diameter will be in the range of 1 nm-1000 micron, and the fiber length is in the range of 2 nm-10000 m. The composite fiber can be made by electro spinning or other methods.

2-Dimensional Plates

Figure 4:
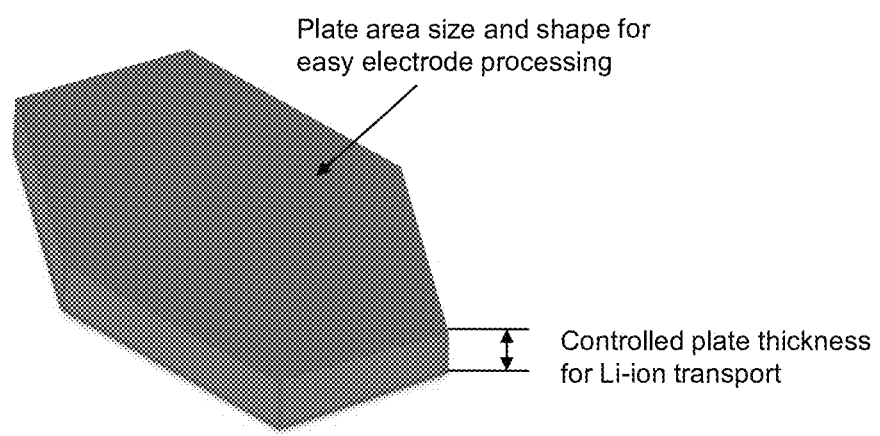
FIG. 4 illustrates a plate structure for the Si/polymer composite. The thickness is controlled for lithium-ion diffusion during lithiation and delithiation. The other dimensions of the plate are controlled for easy electrode slurry mixing and coatings. The plate includes Si and conductive polymer.

FIG. 4 illustrates a plate structure for the Si/polymer composite. The thickness is controlled for lithium-ion diffusion during lithiation and delithiation. The other dimensions of the plate are controlled for easy electrode slurry mixing and coatings. The plate includes Si and conductive polymer. Another approach is to elongate the spherical particle approach in two dimensions to form a plate structure. Only one dimension is controlled for Li ion diffusion through the plate plain. The other two dimensions are adjusted for easy processing for electrode coating but not for lithium-ion diffusion into the particle. The thickness of the composite plate is in the range of 1 nm-1000 micron. The other 2-dimensions will be in the range of 2 nm-5000 micron.

Electrode Laminate Made with These Composite Particles.

Figure 5:
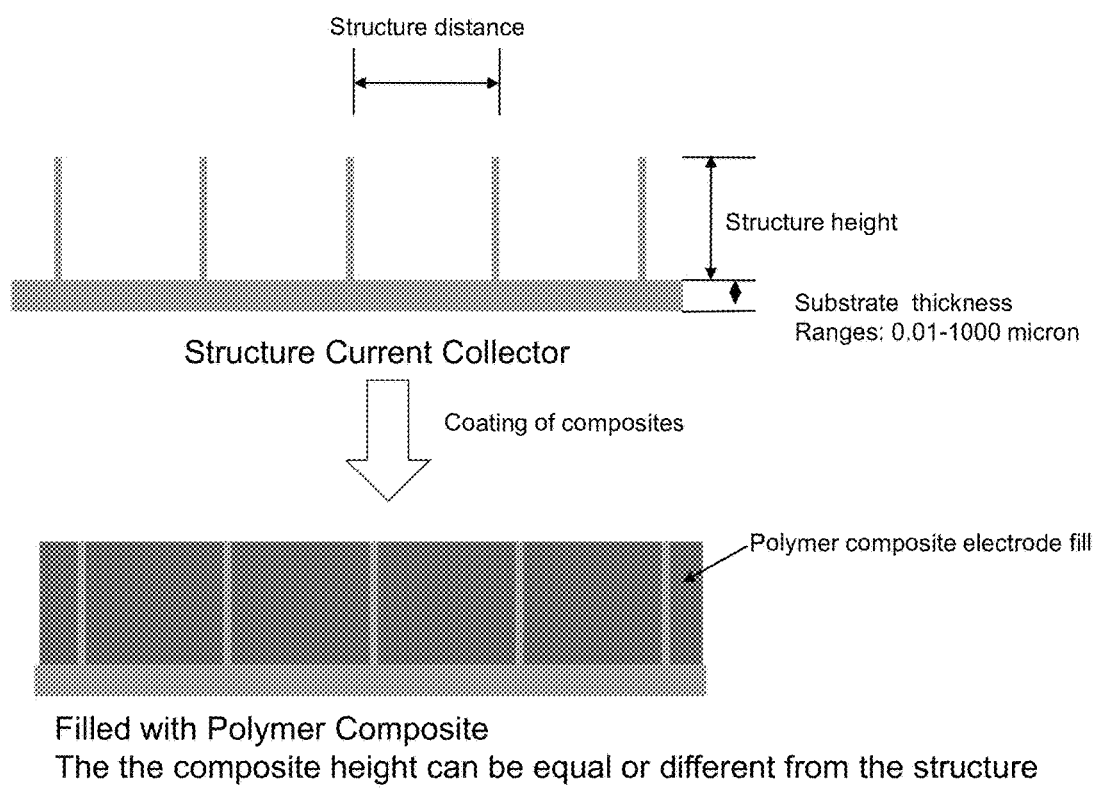
FIG. 5 illustrates a cross-section image of structured Cu current collector, and when coated with polymer composite electrode materials.

These secondary particles will be used to form electrodes using regular Styrene-Butadiene Rubber (SBR) water soluble binder (or neutralized polyacrylic acid water soluble binder) or other available polymer binder materials and acetylene black additive. The secondary particles have stable dimensions during lithium insertion and removal. Therefore the electrode does not have stress build up during cycling. High loading of Si material of high area specific capacity (>=3 mAh/cm$^2$) can be achieved in this invention. Structured Current Collectors as a Method to Improve Active Material Area Specific Loading and Performance FIG. 5 illustrates a cross-section image of 1) a structured Cu current collector, and 2) a structured Cu current collector when coated with polymer composite electrode materials. To further improve both the area specific loading of the electrode and to improve rate performance, a structured current collector is disclosed to integrate with the Si/polymer composite electrode. The current collector can be made of Cu or any metals that do not react with lithium-ion in the 0-2 V Li/Li$^+$. The structure on the surface of the current collector (vertical projections) can be the same material as the substrate or other materials that provide electric conductivity.

For example, the structure on a Cu substrate (vertical projections) may be cylinders of approximately 10 micron diameter and 100 micron long. The cylinders are 100 micron distance from each other. The Si/polymer is formulated into slurry and directly applied onto the structured current collector surface. Alternatively, the secondary particles described above are formulated into slurry and applied onto the structured current collector.

Dry Hot Embalming or Solvent Based Embalming

Another embodiment of the invention discloses definition of micron or nanosized structures in addition to the fabrication of a sphere, a plate or a fiber. Additional embodiments of the invention define generation of structure on the coated conductive polymer and Si composite directly. Both dry embalming and solvent embalming have demonstrated defining precise structure features in the nano and micro scale. Additional embodiments of the invention disclose fine tuning the structural features as the conditions require. A structural feature is first developed on a stamp, the stamp may then roll over the polymer/Si composite electrode to stamp out negative features on the electrode laminate.

Figure 6:
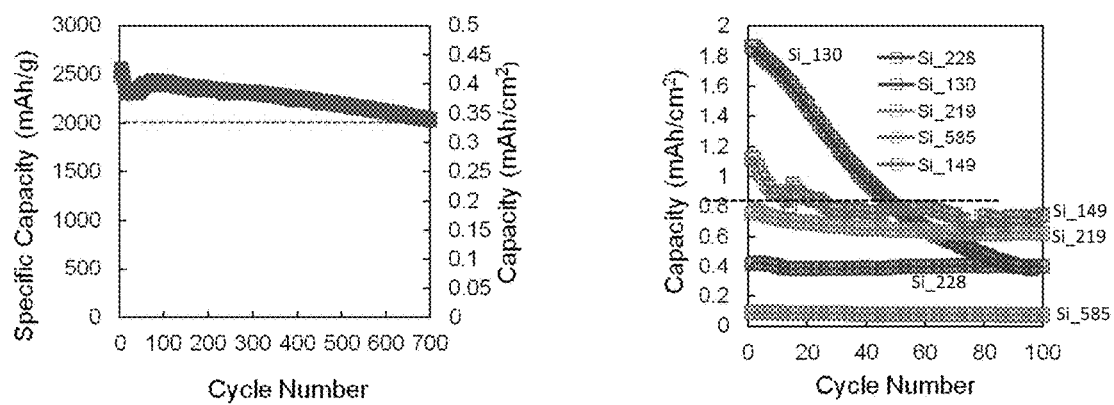
FIG. 6 illustrates Si gravimetric specific capacity based on Nano Si particles with PFFOMB polymer and also illustrates electrode cycling stability decay when electrode Si area loading increases.

FIG. 6 illustrates Si gravimetric specific capacity of 2500 mAh/g can be obtained based on Nano Si particles with PFFOMB polymer. However active loading is low 0.5 mg/cm$^2$ and capacity is around 0.5 mAh/cm$^2$ Porosity. FIG. 6 also illustrates the electrode cycling stability decays when the electrode Si area loading increases.

Figure 7:
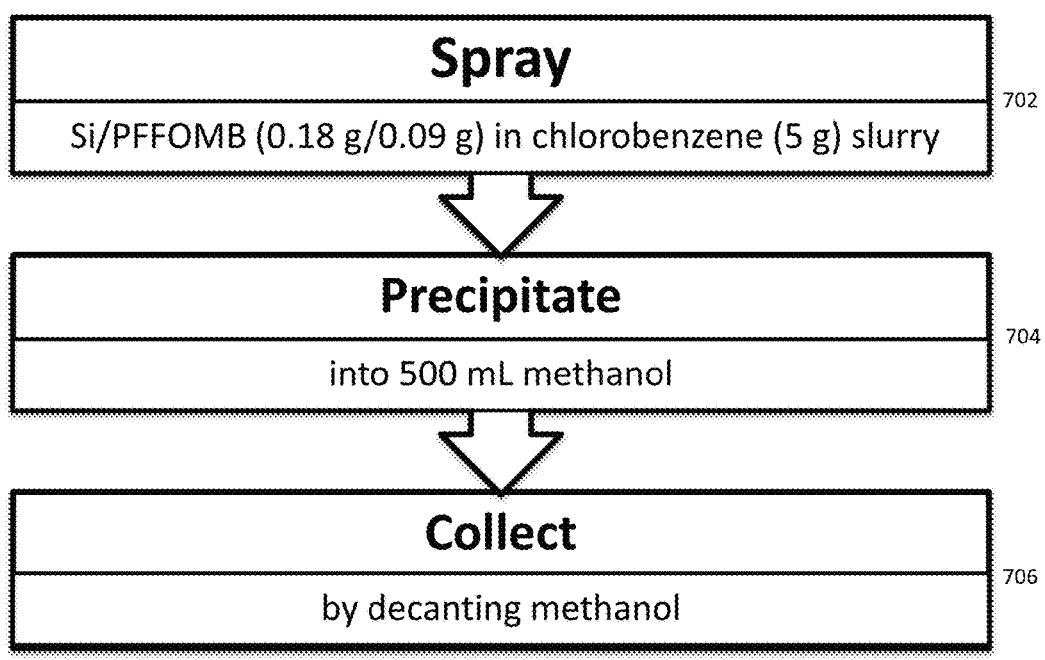
FIG. 7 illustrates a method for preparing Si/PFFOMB composite spheres.

In order to improve area loading of Si, a Si/PFFOMB polymer composite is made into composite spheres with an average diameter of 10 micron. The spheres are formed in a methanol solution and collected by decanting the methanol. The process is referred to as a spray precipitation method. FIG. 7 illustrates a method for preparing Si/PFFOMB composite spheres. Step 702 comprises spraying Si/PFFPMB (0.18 g/0.09 g) in chlorobenzene (5 g) slurry. Step 704 precipitating into 500 mL methanol. Step 706 collecting by decanting methanol.

Figure 8:
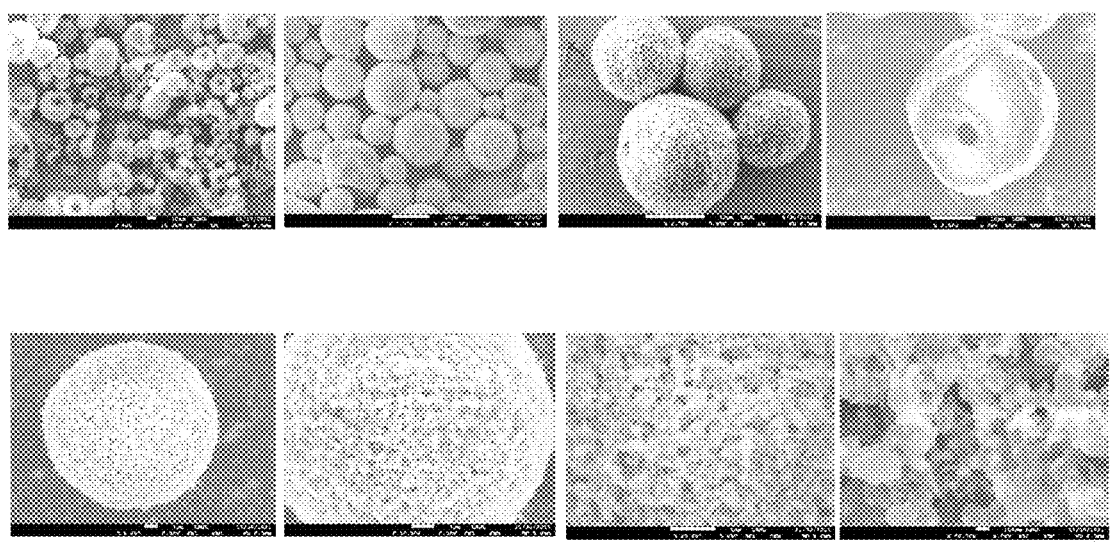
FIG. 8 illustrates SEM images of secondary Si composite particles made with the spray precipitation method.

FIG. 8 illustrates SEM images of secondary Si composite particles made with the spray precipitation method.

Figure 9:
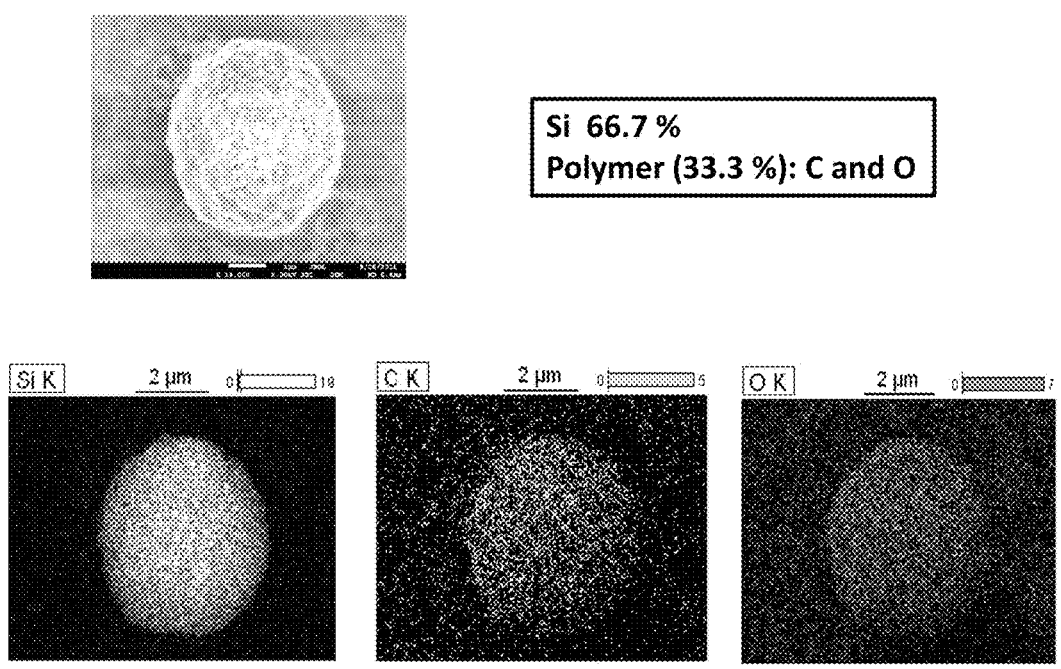
FIG. 9 illustrates SEM-EDX maps of Si composite particles. The maps show a uniform distribution of Si, Carbon and Oxygen of the composite particles.

FIG. 9 illustrates SEM-EDX maps of Si composite particles. The maps show the uniform distribution of Si, Carbon and Oxygen of the composite particles.

Figure 10:
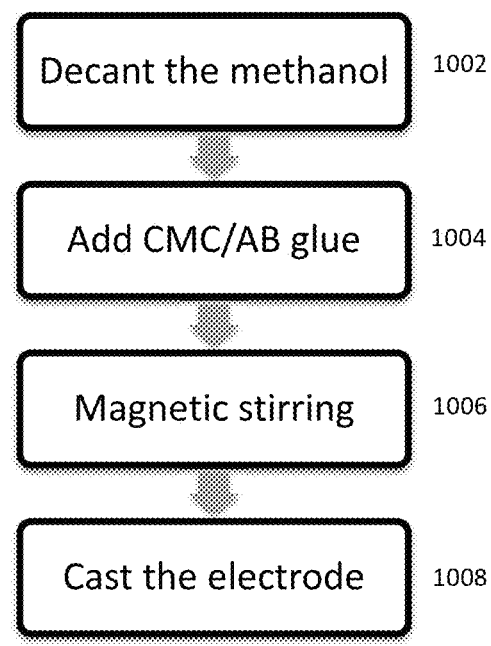
FIG. 10 illustrates a method to fabricate the Si anode electrode with a spray precipitated secondary composite particle electrode.

FIG. 10 illustrates a method to fabricate the Si anode electrode with a spray precipitated secondary composite particle electrode. High speed is at above 1000 RPM. Step 1002 comprises decanting the methanol. Step 1004 adding CMC/AB glue. Step 1006 stirring at high speed. Step 1008 casting the electrode.

Figure 11:
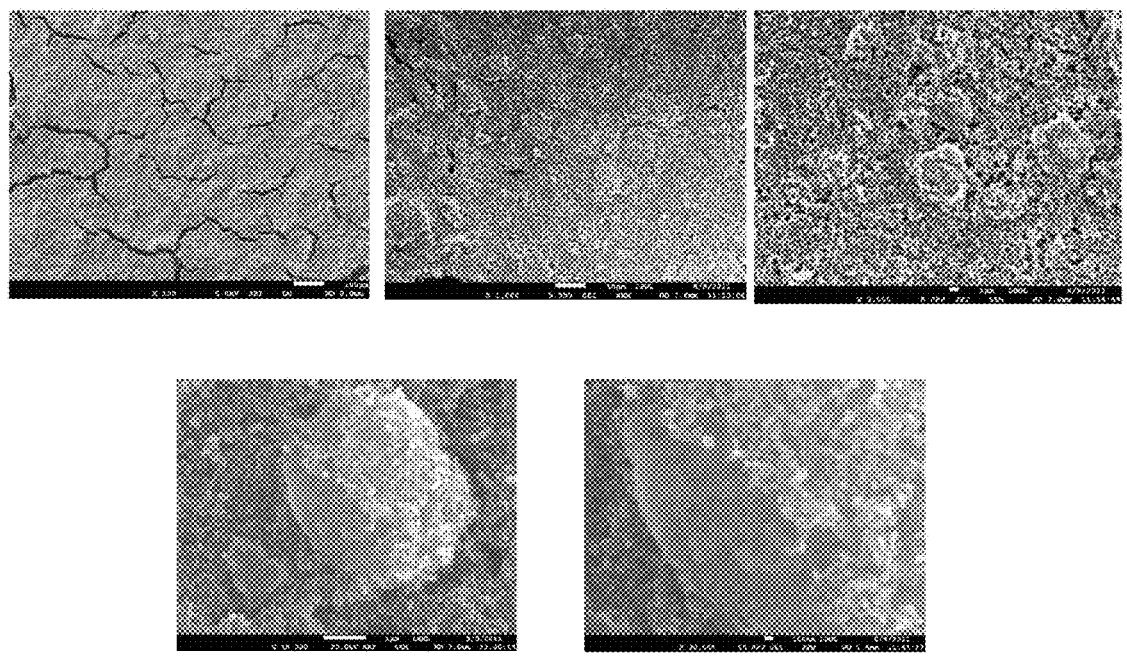
FIG. 11 illustrates SEM images of the surface of electrode made with the method.

FIG. 11 illustrates SEM images of the surface of an electrode made with the first method of FIG. 10. Most of the composite particles are broken.

Figure 12:
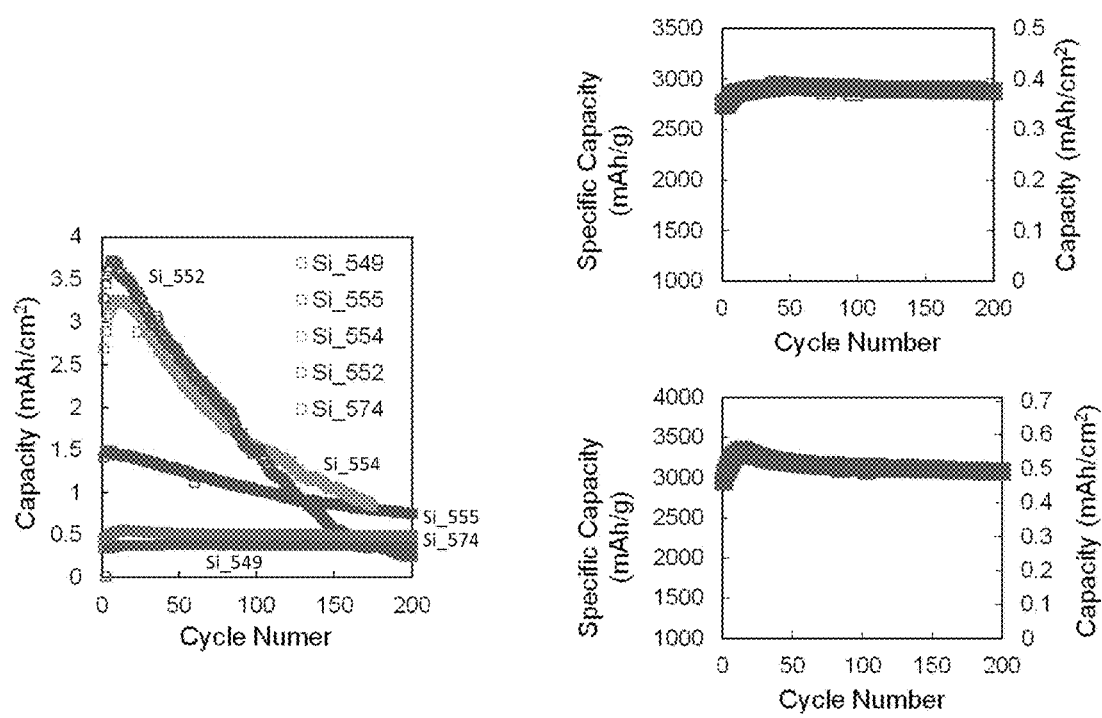
FIG. 12 illustrates cycling stability of the Si electrode made with the Si/PFFOMB composite secondary particles.

FIG. 12 illustrates cycling stability of the Si electrode improved significantly when made with the Si/PFFOMB composite secondary particles.

Figure 13:
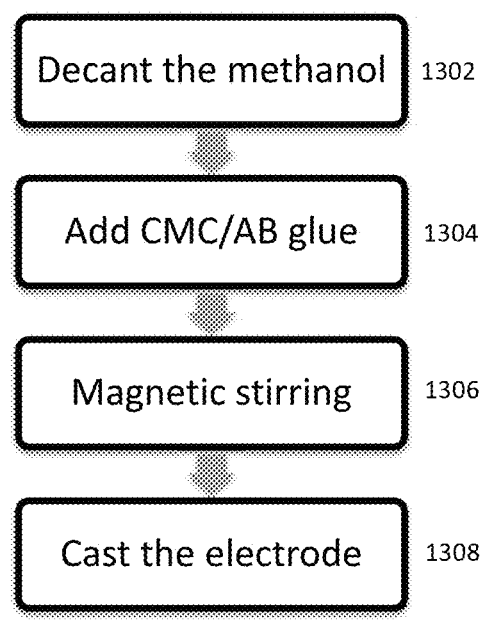
FIG. 13 illustrates a method to fabricate the Si anode electrode with the spray precipitated secondary composite particle electrode.

FIG. 13 illustrates a method to fabricate the Si anode electrode with the spray precipitated secondary composite particle electrode. Low speed is around 100 RPM. Step 1302 comprises decanting the methanol. Step 1304 adding CMC/AB glue. Step 1306 magnetic stirring. Step 1308 casting the electrode.

Figure 14:
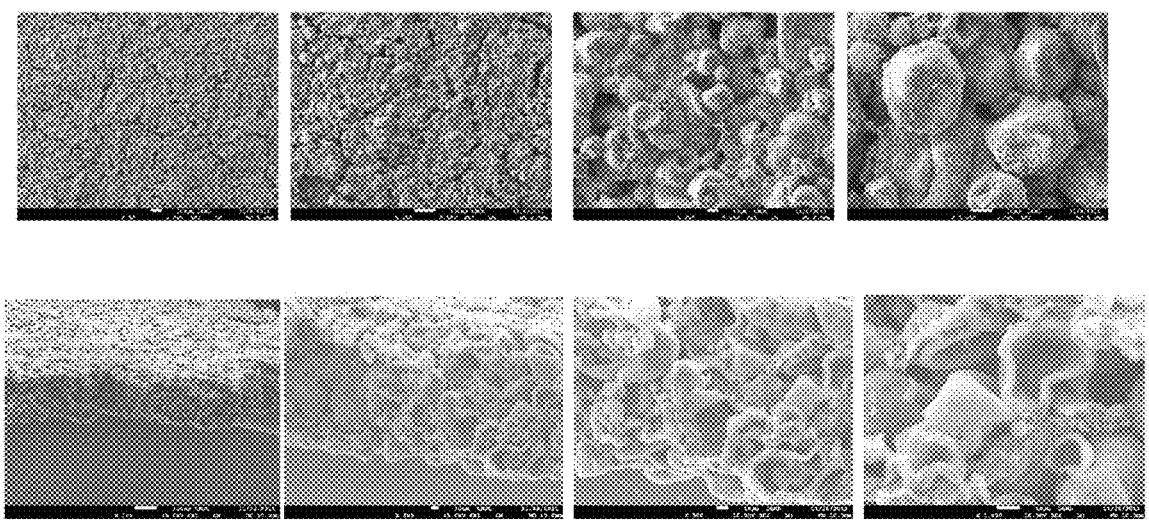
FIG. 14 illustrates SEM images of the electrode made with the second method.

FIG. 14 illustrates SEM images of the electrode made with the second method of FIG. 13. The composite particle structures are preserved.

Figure 15:
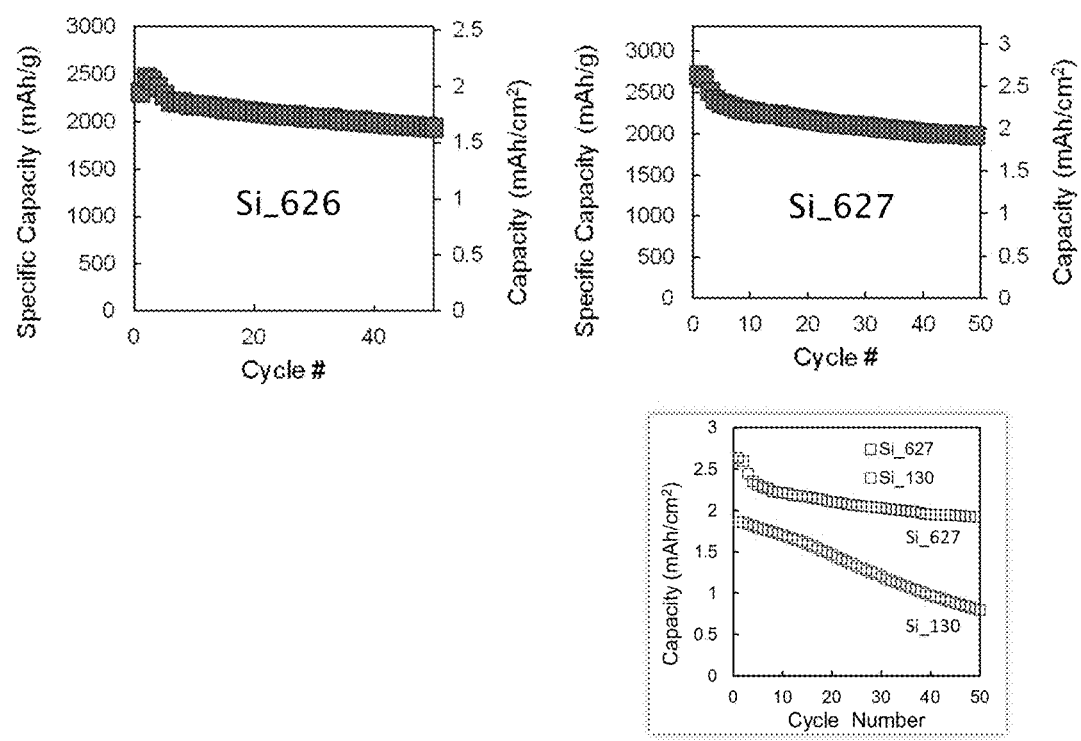
FIG. 15 illustrates cycling stability of the Si electrode made with the Si/PFFOMB composite secondary particles.

FIG. 15 illustrates cycling stability of the Si electrode improved significantly made with the Si/PFFOMB composite secondary particles.

Figure 16:
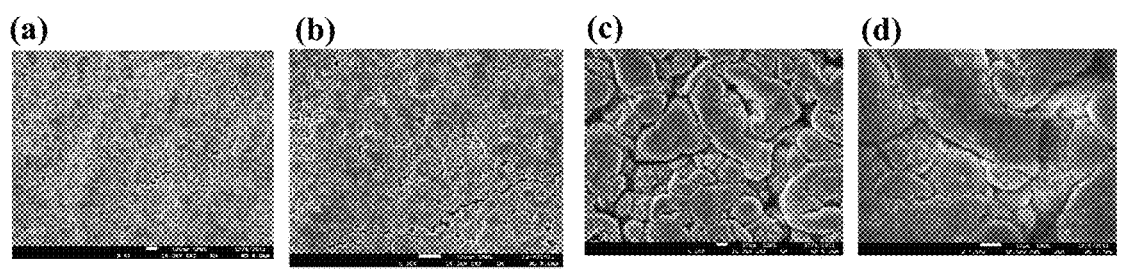
FIG. 16 illustrates SEM images of the electrode surface after cycling.

FIG. 16 illustrates SEM images of the electrode surface after cycling at different magnifications.

Figure 17:
FIG. 17 illustrates SEM images of the electrode cross-section after cycling.

FIG. 17 illustrates SEM images of the electrode cross-section after cycling.

What is claimed is:

1. A battery comprising:
   a cathode; and
   an anode comprising:
      a current collector; and
      a composition of matter comprising a silicon (Si) nanoparticle coated with a conductive polymer, wherein the conductive polymer is poly(9,9-dioctyl-fluorene-co-fluorenone) (PFFO), poly(9,9-dioctyl-fluorene-co-fluorenone-co-methylbenzoic acid) (PFFOMB), or poly(9,9-dioctylfluorene-co-fluorenone-co-benzoic acid) (PFFOBA).

2. The battery of claim 1, wherein the current collector comprises projections perpendicular to a base.

3. The battery of claim 1, wherein the current collector comprises copper (Cu).

4. The battery of claim 1, wherein the conductive polymer is poly(9,9-dioctylfluorene-co-fluorenone-co-methylbenzoic acid) (PFFOMB).

5. The battery of claim 1, wherein the conductive polymer is poly(9,9-dioctylfluorene-co-fluorenone) (PFFO).

6. The battery of claim 1, wherein the conductive polymer is poly(9,9-dioctylfluorene-co-fluorenone-co-benzoic acid) (PFFOBA).

7. The battery of claim 1, wherein a weight ratio of the conductive polymer to Si nanoparticle ranges from 0.01 to 100.

8. The battery of claim 1, wherein the Si nanoparticle is n-doped or p-doped.

9. The battery of claim 1, wherein a porosity of the composition of matter ranges from 1% to 70% void space.

10. The battery of claim 1, wherein the silicon (Si) nanoparticle coated with the conductive polymer forms a secondary particle.

11. The battery of claim 10, wherein the secondary particle can be spherical, two-dimensional plates, or fibers.

12. The battery of claim 11, wherein a dimension of the secondary particle ranges from 1 nm to 1000 μm in diameter.

13. The battery of claim 11, wherein dimensions of the fiber secondary particle range from 1 nm to 1000 μm in diameter and 2 nm to 10000 μm in length.

14. The battery of claim 11 wherein dimensions of the two-dimensional plate secondary particle range from 1 nm to 1000 μm in thickness and 2 nm to 5000 μm in length.

\* \* \* \* \*